United States Patent
Tiesler et al.

(10) Patent No.: US 7,118,511 B2
(45) Date of Patent: Oct. 10, 2006

(54) MULTIPLE GEAR STAGE AUTOMATIC TRANSMISSION

(75) Inventors: Peter Tiesler, Meckenbeuren (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 153 days.

(21) Appl. No.: 10/932,904

(22) Filed: Sep. 2, 2004

(65) Prior Publication Data

US 2005/0054478 A1   Mar. 10, 2005

(30) Foreign Application Priority Data

Sep. 4, 2003   (DE) ................. 103 40 735

(51) Int. Cl.
   *F16H 3/44*   (2006.01)
   *F16H 37/06*   (2006.01)
(52) U.S. Cl. ................. 475/290; 475/286; 475/330
(58) Field of Classification Search ........... 475/275, 475/286, 287, 290–293, 296, 297, 317–319, 475/323–325, 330
   See application file for complete search history.

(56) References Cited

U.S. PATENT DOCUMENTS

| | | | |
|---|---|---|---|
| 3,776,066 A | 12/1973 | Piret | |
| 3,977,272 A | 8/1976 | Neumann | |
| 4,070,927 A | 1/1978 | Polak | |
| 4,395,925 A | 8/1983 | Gaus | |
| 4,660,439 A * | 4/1987 | Hiraiwa | 475/276 |
| 4,732,253 A | 3/1988 | Hiramatsu et al. | |
| 4,939,955 A | 7/1990 | Sugano | |
| 5,106,352 A | 4/1992 | Lepelletier | |
| 5,232,411 A | 8/1993 | Hayashi et al. | |
| 5,250,011 A | 10/1993 | Pierce | |
| 5,295,924 A | 3/1994 | Beim | |
| 5,308,295 A | 5/1994 | Michioka et al. | |
| 5,435,792 A | 7/1995 | Justice et al. | |
| 5,439,088 A | 8/1995 | Michioka et al. | |
| 5,460,579 A | 10/1995 | Kappel et al. | |
| 5,520,588 A | 5/1996 | Hall, III | |
| 5,533,945 A | 7/1996 | Martin et al. | |
| 5,536,220 A | 7/1996 | Martin | |
| 5,542,889 A | 8/1996 | Pierce et al. | |
| 5,647,816 A | 7/1997 | Michioka et al. | |
| 5,735,376 A | 4/1998 | Moroto et al. | |
| 6,139,463 A | 10/2000 | Kasuya et al. | |
| 6,471,616 B1 | 10/2002 | Stevenson | |
| 6,558,287 B1 * | 5/2003 | Hayabuchi et al. | 475/271 |
| 6,572,507 B1 | 6/2003 | Korkmaz et al. | |
| 6,634,980 B1 | 10/2003 | Ziemer | |
| 6,723,018 B1 * | 4/2004 | Hayabuchi et al. | 475/276 |
| 6,887,178 B1 * | 5/2005 | Miyazaki et al. | 475/276 |
| 6,991,578 B1 * | 1/2006 | Ziemer | 475/296 |

(Continued)

FOREIGN PATENT DOCUMENTS

DE   26 19 895   11/1976

(Continued)

*Primary Examiner*—Tisha Lewis
(74) *Attorney, Agent, or Firm*—Davis & Bujold, P.L.L.C.

(57) ABSTRACT

A multiple stage transmission of a planetary design having first, second and third planetary gear sets (P1, P2, P3), at least first, second, third, fourth, fifth and sixth rotatable shafts (1, 2, 3, 4, 5, 6), first and second brakes (03, 04) and first, second, third and fourth clutches (14, 15, 36, 56). Selective engagement of the planetary gear sets (P1, P2, P3), the rotatable shafts (1, 2, 3, 4, 5, 6), the brakes (03, 04) and the clutches (14, 15, 36, 56) produces different reduction ratios between the drive shaft and the driven shaft such that eight forward gears and at least one reverse gear is achieved.

28 Claims, 5 Drawing Sheets

U.S. PATENT DOCUMENTS

| | | | |
|---|---|---|---|
| 7,014,589 B1 * | 3/2006 | Stevenson | 475/284 |
| 7,014,590 B1 * | 3/2006 | Stevenson | 475/284 |
| 2002/0091032 A1 | 7/2002 | Hayabuchi et al. | |
| 2002/0183160 A1 | 12/2002 | Kao et al. | |
| 2003/0060322 A1 | 3/2003 | Raghavan et al. | |
| 2003/0083174 A1 | 5/2003 | Tabata et al. | |
| 2003/0119623 A1 | 6/2003 | Stevenson et al. | |
| 2003/0162625 A1 | 8/2003 | Raghavan et al. | |
| 2004/0092357 A1 | 5/2004 | Biermann | |
| 2004/0097324 A1 | 5/2004 | Ziemer | |
| 2004/0116238 A1 | 6/2004 | Ziemer | |

FOREIGN PATENT DOCUMENTS

| | | |
|---|---|---|
| DE | 27 21 719 | 12/1977 |
| DE | 29 36 969 A1 | 4/1981 |
| DE | 38 25 733 A1 | 2/1989 |
| DE | 42 24 360 A1 | 1/1993 |
| DE | 42 24 361 A1 | 1/1993 |
| DE | 43 02 518 A1 | 8/1993 |
| DE | 43 32 466 A1 | 3/1995 |
| DE | 195 24 698 A1 | 2/1996 |
| DE | 197 02 198 A1 | 7/1998 |
| DE | 198 33 376 A1 | 12/1999 |
| DE | 199 12 480 A1 | 9/2000 |
| DE | 199 12 481 A1 | 9/2000 |
| DE | 199 49 507 A1 | 4/2001 |
| DE | 696 16 117 T2 | 7/2002 |
| DE | 102 00 379 A1 | 8/2002 |
| DE | 102 06 145 A1 | 9/2002 |
| DE | 101 15 983 A1 | 10/2002 |
| DE | 101 15 986 A1 | 10/2002 |
| DE | 101 15 987 A1 | 10/2002 |
| DE | 102 13 820 A1 | 10/2002 |
| DE | 101 46 606 A1 | 4/2003 |
| DE | 102 50 374 A1 | 6/2003 |
| DE | 101 62 877 A1 | 7/2003 |
| DE | 101 62 883 A1 | 7/2003 |
| DE | 101 62 888 A1 | 7/2003 |
| EP | 0 434 525 A1 | 6/1991 |
| EP | 0 605 953 A1 | 7/1994 |
| EP | 0 719 961 A2 | 7/1996 |
| EP | 1 265 006 A2 | 12/2002 |
| JP | 04290649 | 10/1992 |
| JP | 08200456 | 8/1996 |
| JP | 10259861 A | 9/1998 |
| JP | 2000240741 | 9/2000 |
| JP | 2001082555 | 3/2001 |
| JP | 2002323098 | 11/2002 |
| WO | WO-96/01381 | 1/1996 |
| WO | WO 2004007994 A1 * | 1/2004 |

\* cited by examiner

| Grading | 1.61 | 1.38 | 1.48 | 1.32 | 1.3 | 1.13 | 1.1 | Spread | | 7 |
|---|---|---|---|---|---|---|---|---|---|---|
| i-Gear | 7 | 4.35 | 3.14 | 2.1 | 1.6 | 1.24 | 1.1 | 1 | -4 | |
| SE\Gg | 1 | 2 | 3 | 4 | 5 | 6 | 7 | 8 | R1 | R2 |
| 03 | | X | X | | | | | | | |
| 04 | X | | | | | | | | | |
| 14 | | | | X | | X | X | X | | |
| 15 | | | X | X | X | X | | X | | X |
| 36 | | | | | X | | X | | X | |
| 56(IAK) | X | | | | | | | | X | |

Fig. 2

MULTIPLE GEAR STAGE AUTOMATIC TRANSMISSION

This application claims priority from German Application Ser. No. 103 40 735.9 filed Sep. 4, 2003.

FIELD OF THE INVENTION

The invention concerns a multiple stage transmission, particularly an automatic transmission for a motor vehicle.

BACKGROUND OF THE INVENTION

In the prior art, automatic transmission, particularly for motor vehicles, comprise planetary gear sets shifted by means of friction and shifting elements such as clutches and brakes and usually have one starting element, such as a hydrodynamic converter or a fluid clutch, optionally provided with a lock-up clutch and subject to a slip effect.

Such a transmission results from EP 0 434 525 A1. It essentially comprises one drive shaft and one driven shaft disposed parallel with each other, one double planetary gear set disposed concentrically with the driven shaft and five shifting elements in the form of three clutches and two brakes, the optional locking of which by pairs determines the different gear ratios between the drive shaft and the driven shaft. This transmission has a front-mounted range change set and two power paths so that six forward gears are obtained by selective engagement by pairs of the five shifting elements.

Here two clutches are needed in the first power path for transmitting the torque from the front-mounted range change set to two elements of the double planetary gear set. These are situated in the power flow direction essential downstream of the front-mounted range change set in the direction of the double planetary gear set. In the second power path, one other clutch is provided which loosely connects it with another element of the double planetary gear set. The clutches are arranged here so that the internal disc carrier constitutes the output.

In addition, the U.S. Pat. No. 6,139,463 publication has disclosed a compact multiple stage transmission of a planetary design, particularly for motor vehicles, which has two planetary gear sets and one front-mounted range change set, the same as three clutches and two brakes. In this known multiple stage transmission, two clutches C-1 and C-3 are provided in a first power path for transmitting the torque from the front-mounted range change set to the two planetary gear sets. The external disc carrier or the cylinder or piston and pressure compensation side of the clutch C-3 is here connected with a first brake B-1. Besides, the internal disc carrier of the third clutch C-3 is connected with the cylinder or piston and pressure compensation side of the first clutch C-1, the internal disc carrier of the first clutch C-1 is located on the output side and connected with a sun gear of the third planetary gear set.

From the Applicant's DE 199 49 507 A1 is further known a multiple stage transmission where two non-shiftable front-mounted range change sets are provided on the drive shaft which, on the output side, produce two rotational speeds which, together with the rotational speed of the drive shaft, are optionally shiftable by selective engaging of the used shifting elements, to a shiftable double planetary gear set acting upon the driven shaft in a manner such that to change over from one gear to the next sequential higher or lower gear of the two specifically actuated shifting elements, respectively, only one shifting element has to be engaged or disengaged.

From DE 199 12 480 A1 is known an automatically shiftable motor vehicle transmission having three spider planetary gear sets, the same as three brakes and two clutches, for shifting six forward gears and one reverse gear and having one drive shaft and one driven shaft. The automatically shiftable motor vehicle transmission is designed so that the drive shaft is directly connected with the sun gear of the second planetary gear set and the drive shaft is connectable, via the first clutch, with the sun gear of the first planetary gear set and/or via the second clutch with the spider of the first planetary gear set. Additionally or alternatively, the sun gear of the first planetary gear set is connectable, via the first brake, with the housing of the transmission and/or the spider of the first planetary gear set with the housing, via the second brake, and/or the sun gear of the third planetary gear set with the housing via the third brake.

DE 102 13 820 A1 has also disclosed a multiple stage automatic transmission comprising one first input path T1 of a first reduction ratio; one input path T2 which has a higher reduction ratio than said input path T1; one planetary gear set having four elements, said four elements being one first element, one second element, one third element and one fourth element in the sequence of elements in a rotational speed diagram; one clutch C-2 which transmits rotation of the input path T2 to the first element S3; and clutch C-1 which transmits the rotation from the input path T2 to the fourth element S2; one clutch C-4 which transmits rotation from the input path T1 to the first element; one clutch C-3 which transmits rotation from the input path T1 to the second element C-3; one brake B-1 which creates engagement of the fourth element; one brake B-2 which creates engagement of the second element; and one output element coupled with the third element R3.

With the scope of the Applicant's DE 101 15 983 A1 is described a multiple stage transmission having one drive shaft connected with a front-mounted range change set, one driven shaft connected with a rear-mounted range change set and having a maximum of seven shifting elements by the optional shifting of which at least seven forward gears can be shifting without group shift. The front-mounted range change set is formed by a front-mounted planetary gear set or a maximum of two non-shiftable front-mounted planetary gear sets coupled with the front-mounted planetary gear set, the rear-mounted range change set is designed as a two-spider-four shaft transmission with two shiftable rear-mounted range change sets and four free shafts. The first free shaft of said two-spider-four shaft transmission is connected with the first shifting element, the second free shaft with the second and third shifting elements, the third free shaft with the fourth and fifth shifting elements and the fourth free shaft is connected with the driven shaft. For a multiple stage transmission with a total of six shifting elements, the invention additionally proposes to connect the third free shaft or the first free shaft of the rear-mounted range change set with a sixth shifting element. For a multiple stage transmission having a total of seven shifting elements, the invention proposes connecting the third free shaft additionally with a shift shifting element D' and the first free shaft additionally with a seventh shifting element.

Within the scope of the Applicant's DE 101 15 987 has been described a multiple stage transmission having at least seven gears. Said transmission, together with the drive shaft and the driven shaft, comprises one non-shiftable front-mounted range change set and one shiftable rear-mounted range change set in the form of a two-spider-four shaft transmission. The front-mounted range change set comprises one first planetary gear set which, together with the input rotational speed of the drive shaft, offers a second rotational speed which can optionally be shifted to a rear-mounted range change set. The rear-mounted range change set consists of two shiftable planetary gear sets which, with the six shifting elements, can shift at least seven gears, with two power paths being formed. At the same time, group shifts are always advantageously prevented during each shifting operation. One 9-gear multiple stage transmission has further become known from DE 29 36 969; it comprises eight shifting elements and four gear sets.

Automatically shiftable vehicle transmissions of a planetary design have already generally been widely described in the prior art and are subject to permanent developments and improvement. Said transmissions thus must have a sufficient number of forward gears, the same as one reverse gear and a ratio very well suited for motor vehicles with a high total spread and favorable ratio ranges. They must also make possible a high starting ratio in a forward direction and contain a direct gear, the same is adequate for use both in passenger and in commercial vehicles. In addition, said transmission must have low construction cost, especially require a low number of shifting elements and prevent double shifts in a sequential shifting mode so that in case of shiftings in defined gear groups only one shifting element is changed.

The problem on which this invention is based is to propose a multiple stage transmission of the type mentioned above in which the construction cost is optimized and, in addition, the efficiency degree is improved in the main drive gears with regard to towing and gearing losses. Besides, low torque must act on the shifting elements and planetary gear sets in the inventive multiple stage transmission, the same as the rotational speeds of the shafts, shifting elements and planetary gear sets are to be kept as low as possible. The number of gears, the same as the transmission spread must also be increased so that eight forward gears and at least one reverse gear can be advantageously implemented. Besides, the inventive transmission must be adequate for any design of the vehicle, especially for a front-transverse arrangement.

SUMMARY OF THE INVENTION

The invention accordingly proposes a multiple stage transmission of planetary design which has one drive shaft and one driven shaft located in one housing. In addition, also provided are at least three planetary gear sets, at least six rotatable shafts, the same as at least six shifting elements including brakes and clutches, the selective engagement of which by pairs produces different reduction ratios between the drive shaft and the driven shaft so that preferably eight forward gears and at least one reverse gear can be implemented.

The drive shaft is here permanently connected with the ring gear of the first planetary gear set and connectable with a fifth shaft, via one clutch, which is connected with the sun gears of the second and third planetary gear sets and via one clutch connectable with a sixth shaft, said sixth shaft being connected with the spider of the first planetary gear set on one side and on the other side loosely connectable, via one other clutch, with a third shaft which is permanently connected with a ring gear of the second planetary gear set and can be attached to the housing via one brake.

According to the invention, the driven shaft is connected with the spider of the second and of the third planetary gear sets, a fourth shaft being permanently connected with the ring gear of the third planetary gear set, on one side, and on the other side, loosely connectable with the drive shaft, via one clutch, and attachable to the housing via one brake; the sun gear of the first planetary gear set is also non-rotatably connected via one shaft with the housing.

By the inventive configuration of the multiple stage transmission, particularly for passenger motor vehicles, suitable ratios and a considerable increase in the total spread of the multiple stage transmission results whereby an improvement in driving comfort and a significant reduction in consumption are produced.

With the inventive multiple stage transmission, the construction cost is furthermore considerably reduced due to a small number of shifting elements, preferably two brakes and four clutches. It is advantageously possible with the inventive multiple stage transmission, to start off with a hydrodynamic converter, an external starting clutch or with any other suitable external starting element. It is also conceivable to have a starting off operation with one starting element integrated in the transmission. Preferably suitable is a shifting element actuated in the first forward gear and in the first reverse gear.

With the inventive multiple stage transmission, a good degree of efficiency in the main drive gears relative to towing and gearing losses further results.

Besides, torque in the shifting elements and in the planetary gear sets of the multiple stage transmission is low whereby the wear is advantageously reduced in the multiple stage transmission. The low torque also makes correspondingly small dimensions possible whereby the installation space needed and the attendant costs are reduced. In addition, the rotational speeds are also low for the shafts, the shifting elements and the planetary gear sets.

The inventive transmission is furthermore designed so that an adaptability to different drive line configurations is possible both in power flow direction and with regard to space.

BRIEF DESCRIPTION OF THE DRAWINGS

FIG. 2 is a configuration diagram by way of example of the inventive multiple stage transmission according to FIG. 1;

DETAILED DESCRIPTION OF THE INVENTION

Figure 1:
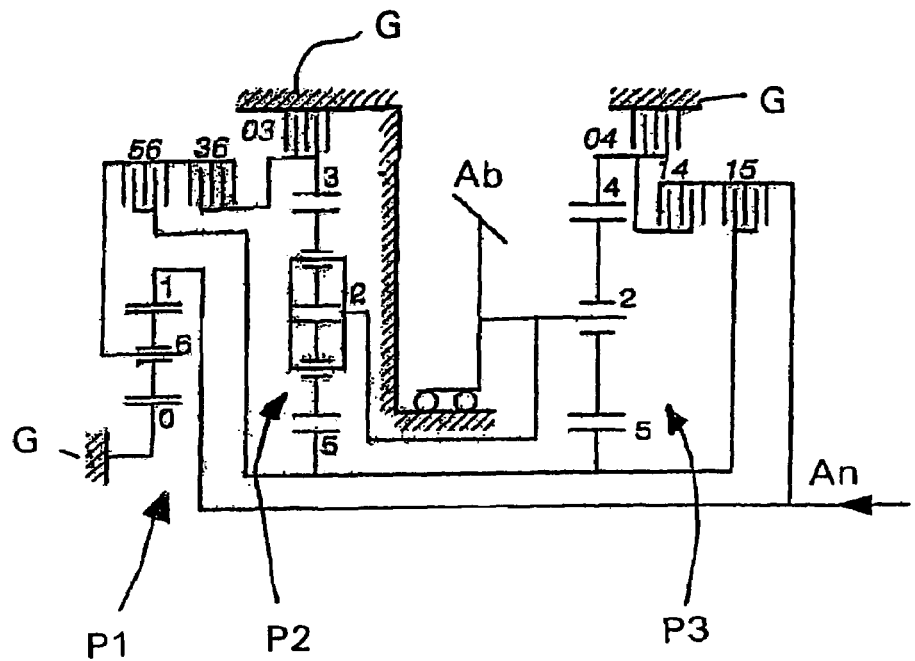
FIG. 1 is a diagrammatic view of a preferred embodiment of an inventive multiple stage transmission suitable for a front-transverse construction.

In FIG. 1, an inventive multi-stage transmission is shown having one drive shaft 1 (An) and one driven shaft 2 (Ab) located in one housing G. Three planetary gear sets P1, P2, P3 are provided. The first planetary gear set P1 and the third planetary gear set P3 are here preferably designed as minus planetary gear sets; the second planetary gear set P2 is inventively designed as plus planetary gear set and the first planetary gear set P1 serving as a reduction planetary gear set.

As can be seen from FIG. 1, only six shifting elements are provided, namely, two brakes 03, 04, e.g., first brake 03 and second brake 04, and four clutches 14, 15, 36, 56, e.g., first clutch 14, second clutch 15, third clutch 36 and fourth clutch 56.

With said shifting elements, a selective shifting of eight forward gears and preferably two reverse gears can be implemented. The inventive multiple stage transmission has a total of six rotatable shafts, namely, the drive shaft, the driven shaft, a third shaft, a fourth shaft, a fifth shaft and a sixth shaft 1, 2, 3, 4, 5, 6.

In the multiple stage transmission, according to FIG. 1, it is inventively provided that the input takes place by the shaft 1 which is permanently connected with the ring gear of the first planetary gear set P1 and connectable, via one clutch 15, with the shaft 5 which is connected with the sun gears of the second and third planetary gear sets and is connectable, via the clutch 56, with the shaft 6 having one side connected with the spider of the first planetary gear set P1 and the other side is loosely connectable, via one clutch 36, with a shaft 3 permanently connected with the ring gear of the second planetary gear set P2. Besides, the shaft 3 is attachable to the housing G via one brake 03. The clutches 56 and 36 are here preferably situated side by side. Within the scope of a preferred embodiment they have one common external disc carrier; and the external disc carriers are situated on the input side.

The output takes place via the shaft 2 which is connected with the spider of the second and of the third planetary gear sets P2, P3. Besides, the shaft 4 is permanently connected, on one side, with the ring gear of the third planetary gear set P3 and, on the other side, loosely connectable via one clutch 14 with the driven shaft 1. Besides, the shaft 4 can be attached, in an area between the ring gear of the third planetary gear set and the clutch 14, to the housing G. The clutches 14 and 15 are preferably disposed side by side. Within the scope of a preferred embodiment, they have a common external disc carrier; and the external disc carrier is situated on the input side. Besides, the sun gear of the first planetary gear set is non-rotatably connected with the housing G via one shaft 0.

The spatial arrangement of the shifting elements can be arbitrary and limited only by the measurements and the external molding.

In FIG. 2, a configuration diagram of the inventive multiple stage transmission according to FIG. 1 is shown by way of example. For each gear, two shifting elements are engaged. From the configuration diagram, the respective ratios i of the individual gear steps and the ratio range to be determined therefrom can be determined by way of example. It can further be determined from the configuration diagram that during sequential shifting, double shift or group shifts are prevented since two adjacent gear steps use one common shifting element. As can be understood from the configuration diagram, it is also possible, without a group shift, to skip over gears, for example, 1–3, 2–4, 2–8, etc. The eighth gear is preferably designed as a direct gear, the ratio range for the upper gears being small. This configuration diagram is especially adequate for a passenger vehicle.

For the first three gears, the brake 04 is always engaged. In addition, for first gear the clutch 56, for second gear the clutch 15 and for third gear the clutch 36 are engaged. For fourth, fifth and sixth gears, the clutch 36 is always engaged. In addition, for fourth gear the clutch 15, for fifth gear the clutch 56 and for sixth gear the clutch 14 are engaged. The seventh gear results by engaging the clutches 14 and 56 and the eighth gear by engaging the clutches 14 and 15. For the first reverse gear, the brake 03 and the clutch 15 are engaged.

According to the invention, a start-off with an integrated shifting element is possible (IAK). The clutch 56 is here especially suitable, since it is used in the first reverse gear without reversing the direction of rotation. The high ratio of the first reverse gear results in good switching; a change over is also possible between the reverse gears without a group shift, which is advantageous for safety vehicles.

According to the invention, different gear ratios can result with the same transmission diagram in conformity with shifting logic so that a variation in use specific to the vehicle is made possible.

Figure 3:
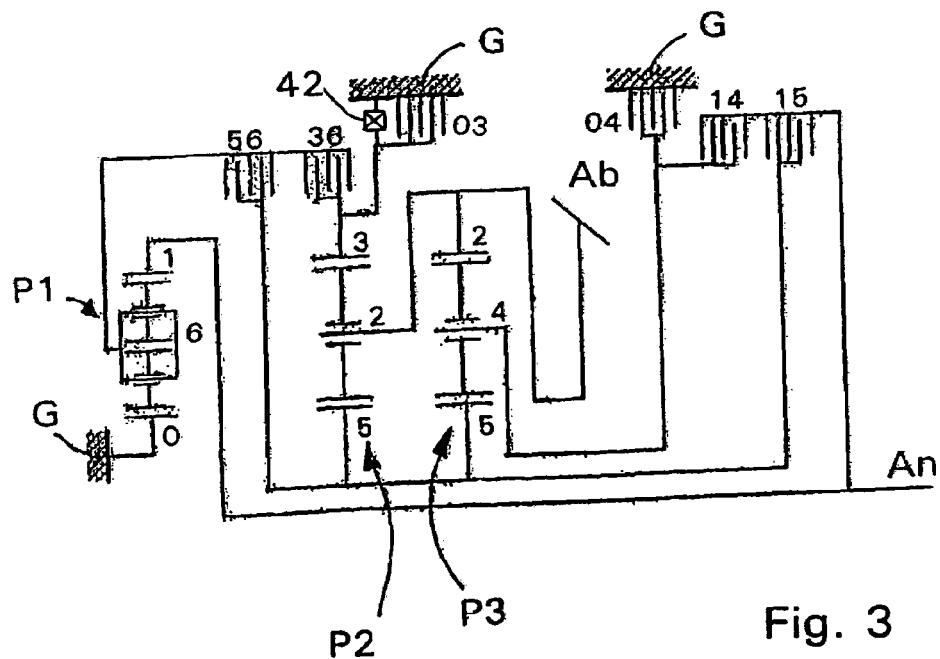
FIG. 3 is a diagrammatic view of an embodiment of the inventive multiple gear transmission having a free wheel.

According to the invention, it is further possible to provide an additional free-wheel 42 on each suitable place of the multiple stage transmission, for example, between one shaft and the housing G, as shown in FIG. 3, or optionally to connect two shafts.

Figure 4:
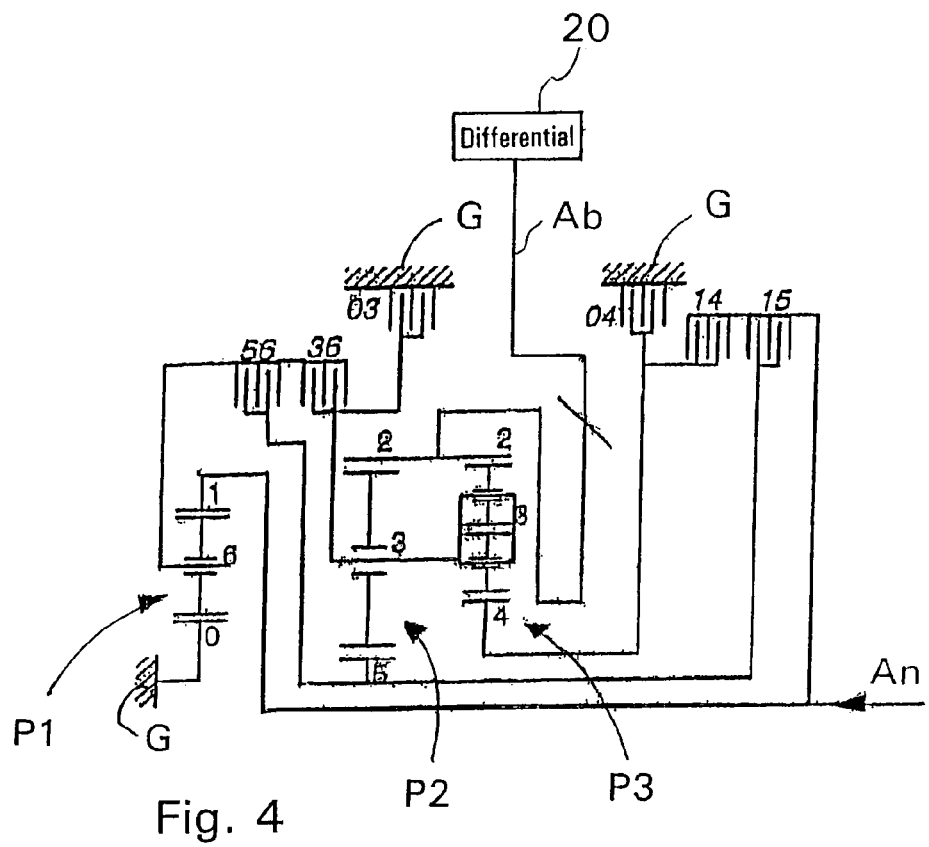
FIG. 4 is a diagrammatic view of an embodiment of the inventive multiple gear transmission having a differential.

On the input side or on the output side, as shown in FIG. 4, one of an axle differential and/or a transfer differential 20 can be situated according to the invention.

Figure 5:
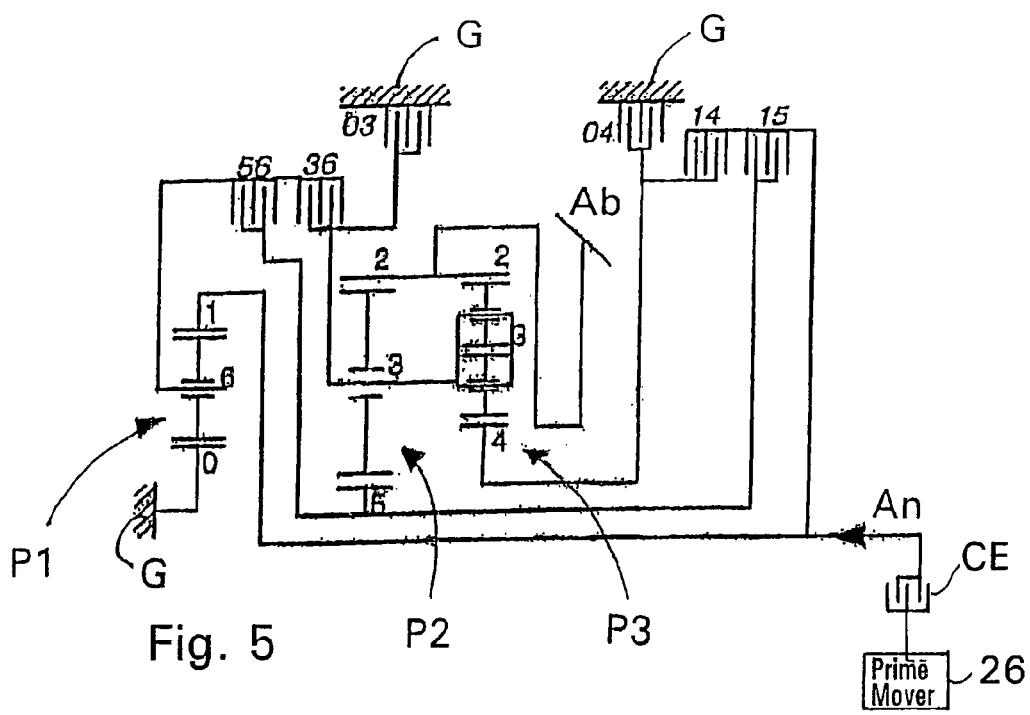
FIG. 5 is a diagrammatic view of an embodiment of the inventive multiple gear transmission with a clutch and a prime mover.
Figure 6:
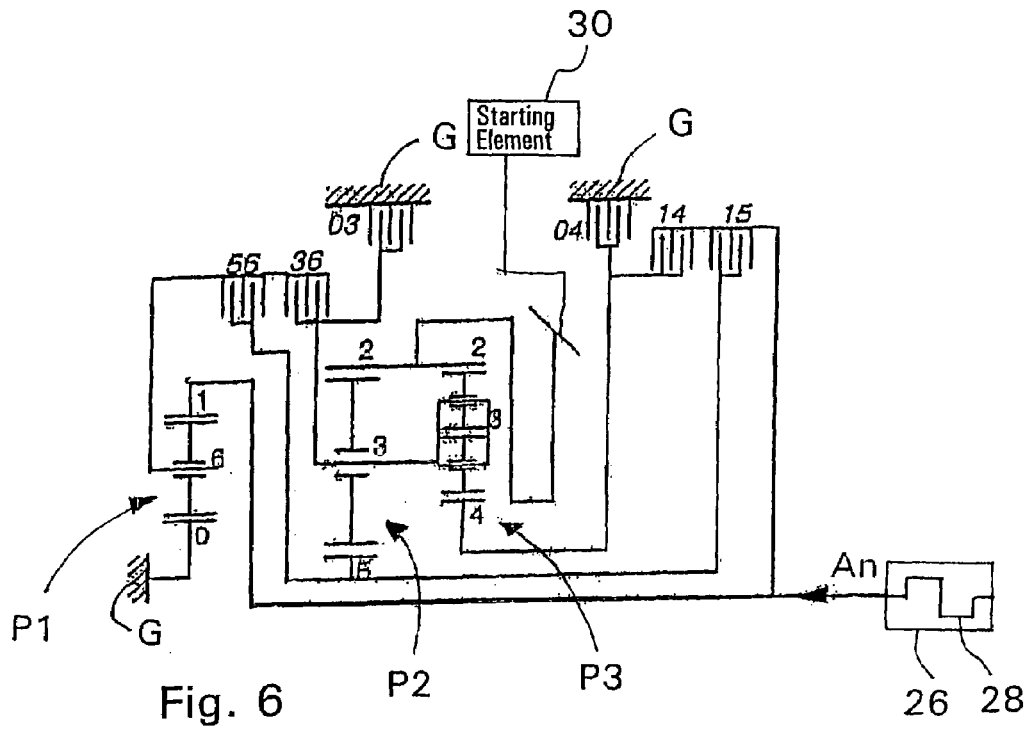
FIG. 6 is a diagrammatic view of an embodiment of the inventive multiple gear transmission having the transmission located between a prime mover and a starting element.

Within the scope of an advantageous development, as shown in FIG. 5, the drive shaft 1 can be separated, as needed, from a prime mover 26 by a clutch element CE, it being possible to use a hydrodynamic converter, a hydraulic clutch, a dry starting clutch, a wet starting clutch, a magnetic powder clutch, or a centrifugal clutch as a clutch element. It is also possible, as shown in FIG. 6, to place such a starting element 30 in a power flow direction downstream of the transmission in which case the drive shaft 1 is permanently connected with the crankshaft 28 of the motor or the prime mover 26.

Figure 7:
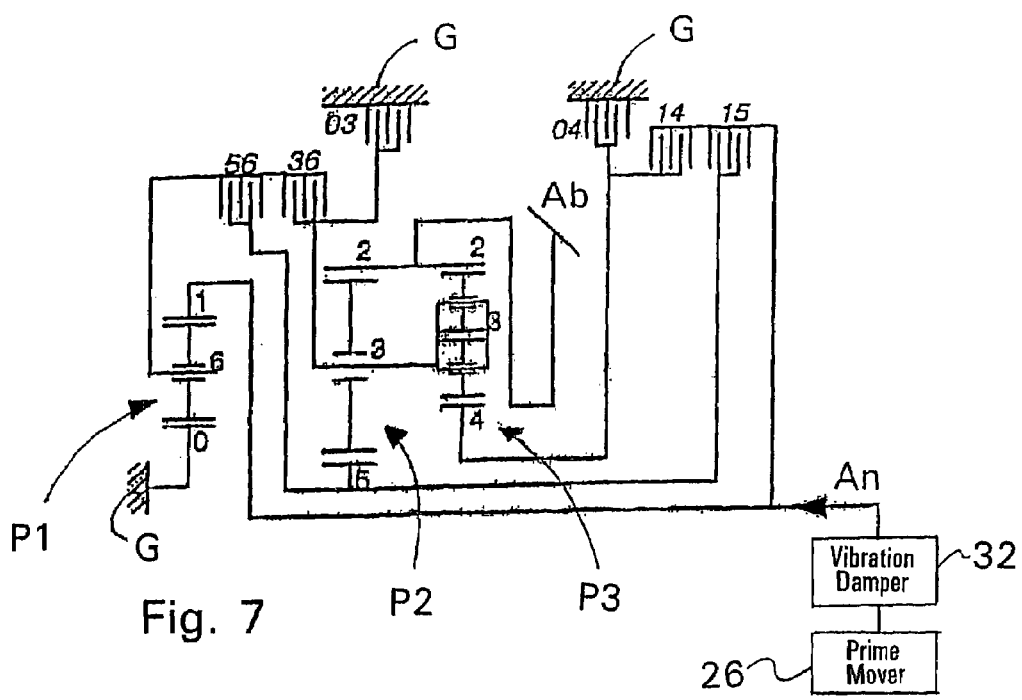
FIG. 7 is a diagrammatic view of an embodiment of the inventive multiple gear transmission having a prime mover and a damper.

The inventive multiple stage transmission besides makes possible placing a torsional vibration damper 32 between the motor or the prime mover 26 and the transmission, as shown in FIG. 7.

Figure 8:
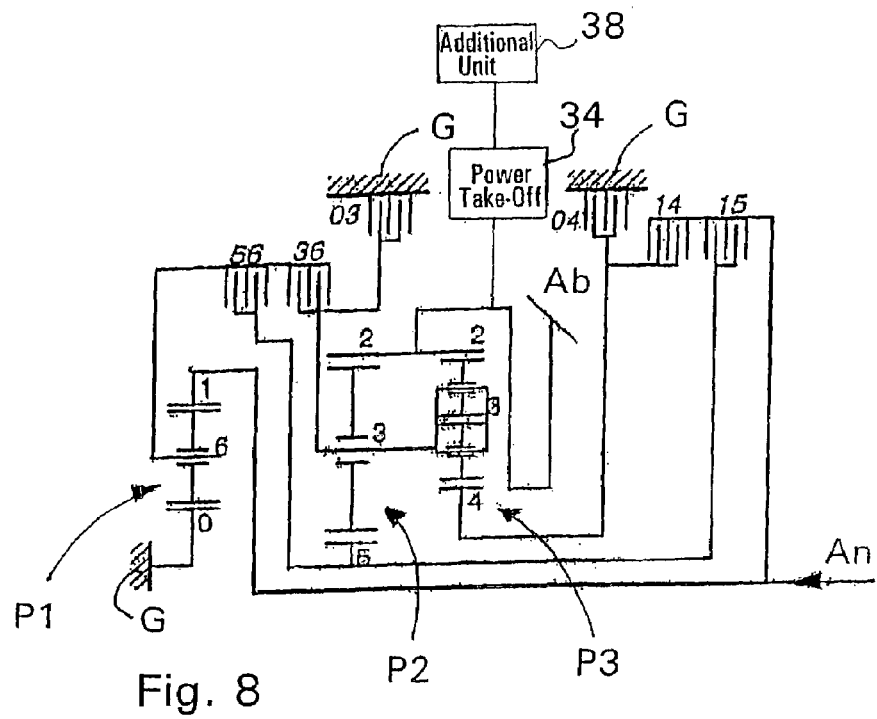
FIG. 8 is a diagrammatic view of an embodiment of the inventive multiple gear transmission with a power take off for an additional unit.

Within the scope of another embodiment of the invention it is possible to situate a wear-free brake (only diagrammatically shown), such as a hydraulic or electric retarder or the like, upon each shaft, preferably upon the drive shaft 1 or the driven shaft 2, which is especially important for use in commercial vehicles. It is also possible to provide, as shown in FIG. 8, a power take-off 34 on at least one shaft, preferably on the drive shaft 1 or the driven shaft 2 for driving an additional unit 38.

The used shifting elements can be designed as power shifting clutches or brakes. Especially force-locking clutches or brakes like multi-disc clutches, band brakes and/or tapered clutches can be used. Besides, form-locking brakes and/or clutches, such as synchronizers or dog clutches, can also be used as the shifting elements.

Figure 9:
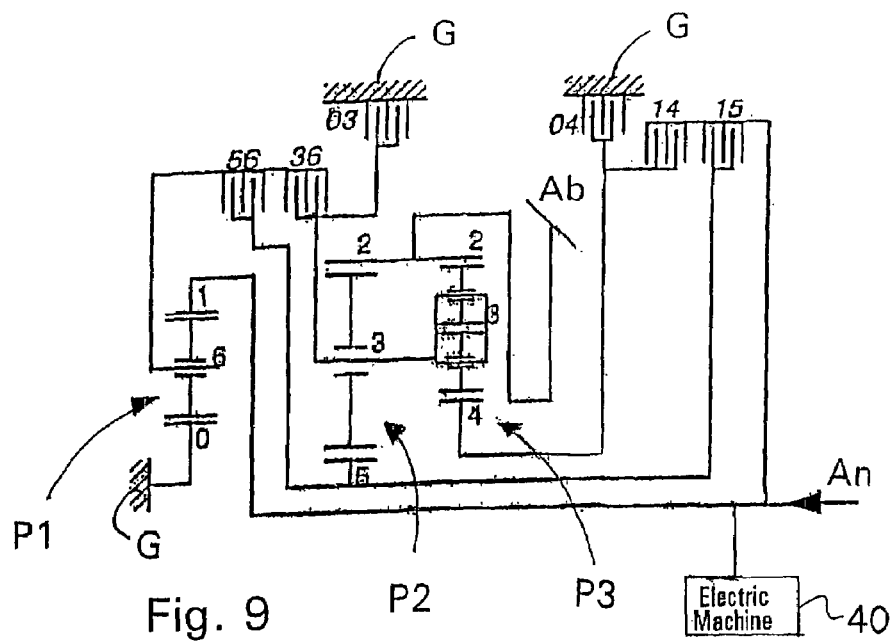
FIG. 9 is a diagrammatic view of an embodiment of the inventive multiple gear transmission with an electric machine.

Another advantage of the multiple stage transmission introduced here is that an electric machine 40 can be mounted upon at least one shaft as a generator and/or as an additional prime mover, as shown in FIG. 9.

Every constructional design, especially every spatial arrangement of the planetary gear sets and of the shifting elements per se the same as relative to each other and insofar as technically convenient, obviously falls under the scope of protection of the instant claims without affecting the operation of the transmission such as indicated in the claims even if said designs are not explicitly shown in the Figures or in the description.

| Reference numerals | |
|---|---|
| 0 shaft | 15 clutch |
| 1 shaft | 36 clutch |
| 2 shaft | 56 clutch |
| 3 shaft | P1 planetary gear set |
| 4 shaft | P2 planetary gear set |
| 5 shaft | P3 planetary gear set |
| 6 shaft | An input |
| 03 brake | Ab output |
| 04 brake | i ratio |
| 14 clutch | G housing |

The invention claimed is:

1. A multiple stage transmission of a planetary design for an automatic transmission of a motor vehicle, the multiple stage transmission comprising:
a housing (G) accommodating:
a drive shaft (1) and a driven shaft (2);
a first planetary gear set (P1);
a second planetary gear set (P2);
a third planetary gear set ( P3);
at least third, fourth, fifth, and sixth rotatable shafts (3, 4, 5, 6) and a fixed shaft (0);
at least first, second, third, fourth, fifth and sixth shifting elements (03, 04, 14, 15, 36, 56) including first and second brakes (03, 04) and first, second, third and fourth clutches (14, 15, 36, 56) which are selectively engageable to produce different gear ratios between the drive shaft (1) and the driven shaft (2) such that the transmission implements at least first, second, third, fourth, fifth, sixth, seventh and eighth forward gears and at least one reverse gear;
the drive shaft (1) being permanently connected with a ring gear of the first planetary gear set (P1) and being connectable, via the second clutch (15), with the fifth shaft (5) which is connected with a sun gear of the second planetary gear set (P2) and a sun gear of the third planetary gear set (P3), and the fifth shaft (5) being connectable, via the fourth clutch (56), with the sixth shaft (6);
the sixth shaft (6), adjacent a first end, being connected with a spider of the first planetary gear set (P1) and, adjacent a second end, being connectable, via the third clutch (36), with the third shaft (3) which is permanently connected with a ring gear of the second planetary gear set (P2) and connectable, via the first brake (03), with the housing (G);
the driven shaft (2) being connected with a spider of the second planetary gear set (P2) and a spider of the third planetary gear set (P3);
the fourth shaft (4), adjacent one end, being permanently connected with a ring gear of the third planetary gear set (P3) and, adjacent a second end, being connectable, via the first clutch (14), with the drive shaft (1), and the fourth shaft (4), being connectable, via the second brake (04), with the housing (G); and
the sun gear of the first planetary gear set (P1) being non-rotatably connected with the housing (G) via a seventh shaft (0).

2. The multiple stage transmission according to claim 1, wherein the eight forward gears are shiftable so that during a gear change from one forward gear to one of a next sequentially higher and a next sequentially lower gear, only one previously engaged shifting element is disengaged and only one previously unengaged shifting element is engaged.

3. The multiple stage transmission according to claim 1, wherein two respective shifting elements are engaged for each one of the eight forward gears and for the at least one reverse gear.

4. The multiple stage transmission according to claim 1, wherein the second brake and the fourth clutch (04, 56) are engage for the first forward gear, the second brake and the second clutch (04, 15) are engage for the second forward, the second brake and the third clutch (04, 36) are engage for the third forward gear, the second clutch and the third clutch (15, 36) are engage for the fourth forward gear, the third clutch and the fourth clutch (36, 56) are engage for the fifth forward gear, the first clutch and the third clutch (14, 36) are engage for the sixth forward gear, the first clutch and the fourth clutch (14, 56) are engage for the seventh forward gear, and the first clutch and the second clutch (14, 15) are engage for the eighth forward gear.

5. The multiple stage transmission according to claim 1, wherein the multiple stage transmission has first and second reverse gears.

6. The multiple stage transmission according to claim 5, wherein during a gear change from one of the first and the second reverse gears to the other of the first and the second reverse gears only one previously engaged shifting element is disengaged and one previously unengaged shifting element is engaged.

7. The multiple stage transmission according to claim 1, wherein the first brake (03) and one of the second and fourth clutches (15, 56) are engaged for the at least one reverse gear.

8. The multiple stage transmission according to claim 1, wherein at least one of the first and the second clutches (14, 15) and one of the third and the fourth clutches (36, 56) are respectively disposed side by side.

9. The multiple stage transmission according to claim 1, wherein at least one of the first and the second clutches (14, 15) and one of the third and the fourth clutches (36, 56) respectively have a common external disc carrier.

10. The multiple stage transmission according to claim 1, wherein at least one of an external disc carrier of the first and the second clutches (14, 15) and an external disc carrier of the third and the fourth clutches (36, 56) is located on the input side of the multiple stage transmission.

11. The multiple stage transmission according to claim 1, wherein the second planetary gear set (P2) is a plus planetary gear set and the first planetary gear set (P1) and the third planetary gear set (P3) are both minus planetary gear sets.

12. The multiple stage transmission according to claim 1, wherein at least one freewheel is provided between the housing (G) and one of the drive shaft, the driven shaft, the third shaft, the fourth shaft, the fifth shaft and the sixth shaft (1, 2, 3, 4, 5, 6).

13. A multiple stage transmission of a planetary design for an automatic transmission of a motor vehicle, the multiple stage transmission comprising:
a housing (G) accommodating:
a drive shaft (1) and a driven shaft (2);
a first planetary gear set (P1);

a second planetary gear set (P2);
a third planetary gear set (P3);
at least third, fourth, fifth, and sixth rotatable shafts (3, 4, 5, 6) and a fixed shaft (0);
at least first, second, third, fourth, fifth and sixth shifting elements (03, 04, 14, 15, 36, 56) including first and second brakes (03, 04) and first, second, third and fourth clutches (14, 15, 36, 56) which are selectively engageable to produce different gear ratios between the drive shaft (1) and the driven shaft (2) such that the transmission implements at least first, second, third, fourth, fifth, sixth, seventh and eighth forward gears and first and second reverse gears;
the drive shaft (1) being permanently connected with a ring gear of the first planetary gear set (P1) and being connectable, via the second clutch (15), with the fifth shaft (5) which is connected with a sun gear of the second planetary gear set (P2) and a sun gear of the third planetary gear set (P3), and the fifth shaft (5) being connectable, via the fourth clutch (56), with the sixth shaft (6);
the sixth shaft (6), adjacent a first end, being connected with a spider of the first planetary gear set (P1) and, adjacent a second end, being connectable, via the third clutch (36), with the third shaft (3) which is permanently connected with a ring gear of the second planetary gear set (P2) and connectable, via the first brake (03), with the housing (G);
the driven shaft (2) being connected with a spider of the second planetary gear set (P2) and a spider of the third planetary gear set (P3);
the fourth shaft (4), adjacent one end, being permanently connected with a ring gear of the third planetary gear set (P3) and, adjacent a second end, being connectable, via the first clutch (14), with the drive shaft (1), and the fourth shaft (4), being connectable, via the second brake (04), with the housing (G);
the sun gear of the first planetary gear set (P1) being non-rotatably connected with the housing (G) via a seventh shaft (0); and
the first brake (03) is engaged for both the first and the second reverse gears.

14. The multiple stage transmission according to claim 1, wherein an input side and an output side of the multiple stage transmission are both located on one side of the housing (G).

15. The multiple stage transmission according to claim 1, wherein one of an axle and a transfer differential is provided upon one of an input side and an output side of the multiple stage transmission.

16. The multiple stage transmission according to claim 1, wherein a fifth clutch facilitates separating the drive shaft (1) from a prime mover of the multiple stage transmission.

17. The multiple stage transmission according to claim 16, wherein the fifth clutch is one of a hydrodynamic converter, a hydraulic clutch, a dry starting clutch, a wet starting clutch, a magnetic powder clutch, and a centrifugal clutch.

18. The multiple stage transmission according to claim 1, wherein the drive shaft (1) is permanently connected with a crankshaft of a prime mover and an external starting element is provided in a power flow direction downstream of the multiple stage transmission.

19. The multiple stage transmission according to claim 1, wherein the drive shaft (1) is permanently connected with a crankshaft of a prime mover and a starting element of the transmission facilitates starting of the multiple stage transmission.

20. The multiple stage transmission according to claim 19, wherein the fourth clutch (56) is used as the starting element for starting the multiple stage transmission.

21. The multiple stage transmission according to claim 1, wherein a torsional vibration damper is located between a prime mover and the multiple stage transmission.

22. The multiple stage transmission according to claim 1, wherein a wear-free brake is provided on at least one of the drive shaft, the driven shaft, the third shaft, the fourth shaft, the fifth shaft and the sixth shaft (1, 2, 3, 4, 5, 6) of the multiple stage transmission.

23. The multiple stage transmission according to claim 1, wherein a power take-off is provided upon at least one of the drive shaft, the driven shaft, the third shaft, the fourth shaft, the fifth shaft and the sixth shaft (1, 2, 3, 4, 5, 6) for driving an additional unit.

24. The multiple stage transmission according to claim 23, wherein the power take-off is provided upon one of the drive shaft (1) and the driven shaft (2).

25. The multiple stage transmission according to claim 1, wherein each shifting element is one of a power shifting clutch and a power shifting brake.

26. The multiple stage transmission according to claim 1, wherein each shifting element is one of a multi-disc clutch, a band brake and a tapered clutch.

27. The multiple stage transmission according to claim 1, wherein each shifting element is one of a form-locking brake and a form-locking clutch.

28. The multiple stage transmission according to claim 1, wherein an electric machine is mounted on at least one of the drive shaft, the driven shaft, a third shaft, a fourth shaft, a fifth shaft and a sixth shaft (1, 2, 3, 4, 5, 6) and functions as one of a generator and an additional prime mover.

* * * * *